United States Patent [19]

Beckwith, Jr.

[11] Patent Number: 5,231,768

[45] Date of Patent: Aug. 3, 1993

[54] STACKED BLOCK STEP GAGE

[75] Inventor: Walter L. Beckwith, Jr., Warwick, R.I.

[73] Assignee: Brown & Sharpe Manufacturing Co., North Kingstown, R.I.

[21] Appl. No.: 706,953

[22] Filed: May 29, 1991

[51] Int. Cl.⁵ .................................................. G01B 3/30
[52] U.S. Cl. ...................................................... 33/567
[58] Field of Search ................................. 33/567, 567.1

[56] References Cited

U.S. PATENT DOCUMENTS

| | | | |
|---|---|---|---|
| 1,491,098 | 4/1924 | Hoke | 33/567 |
| 1,491,100 | 4/1924 | Hoke | 33/567 |
| 1,502,075 | 7/1924 | Weaver | |
| 1,514,525 | 11/1924 | Hoke | |
| 2,208,371 | 7/1940 | Johansson | 33/168 |
| 2,469,502 | 5/1949 | Hallin | 33/168 |
| 2,500,313 | 3/1950 | Harrington | 33/168 |
| 2,536,401 | 1/1951 | Victor | 33/567 |
| 2,537,340 | 1/1951 | Fonda | 33/168 |
| 2,636,279 | 4/1953 | Tornebohm | 33/168 |
| 2,642,668 | 6/1953 | Dorel | 33/168 |
| 2,758,514 | 8/1956 | Cadwallader | 90/59 |
| 2,807,881 | 10/1957 | Özbilgic | 33/162 |
| 2,831,256 | 4/1958 | Werle | 33/168 |
| 2,840,916 | 7/1958 | Mueller | 33/567 |
| 2,853,786 | 9/1958 | Ellstrom, Sr. | 33/168 |
| 3,162,955 | 12/1964 | Egli | 33/168 |
| 3,184,856 | 5/1965 | Theuerkauf et al. | 33/567 |
| 3,276,132 | 10/1966 | Egli | 33/168 |
| 3,417,475 | 12/1968 | Vlasaty | |
| 3,775,858 | 12/1973 | Meyer | 33/168 |
| 3,956,092 | 5/1976 | Kampe et al. | 204/192 |
| 4,445,276 | 5/1984 | Vöneky et al. | 33/168 |
| 4,926,565 | 5/1990 | Kummerer | 33/567 |

FOREIGN PATENT DOCUMENTS

| | | | |
|---|---|---|---|
| 0037201 | 2/1988 | Japan | 33/567 |
| 0114115 | 4/1990 | Japan | 33/567 |

OTHER PUBLICATIONS

Starrett Standard Reference Bars Catalog, p. 413.
Precision Step Gauge, Kolb & Baumann GmbH & Co. KG (1988–4th Edition).

Primary Examiner—Thomas B. Will
Attorney, Agent, or Firm—Wolf, Greenfield & Sacks

[57] ABSTRACT

The invention comprises a contacting block step gage in which the individual blocks are fastened together under extremely high compressive forces and any bending of the step gage is compensated for and in which the measuring surface is on the neutral axis of the gage and accessible via probe clearance channels in the blocks.

26 Claims, 11 Drawing Sheets

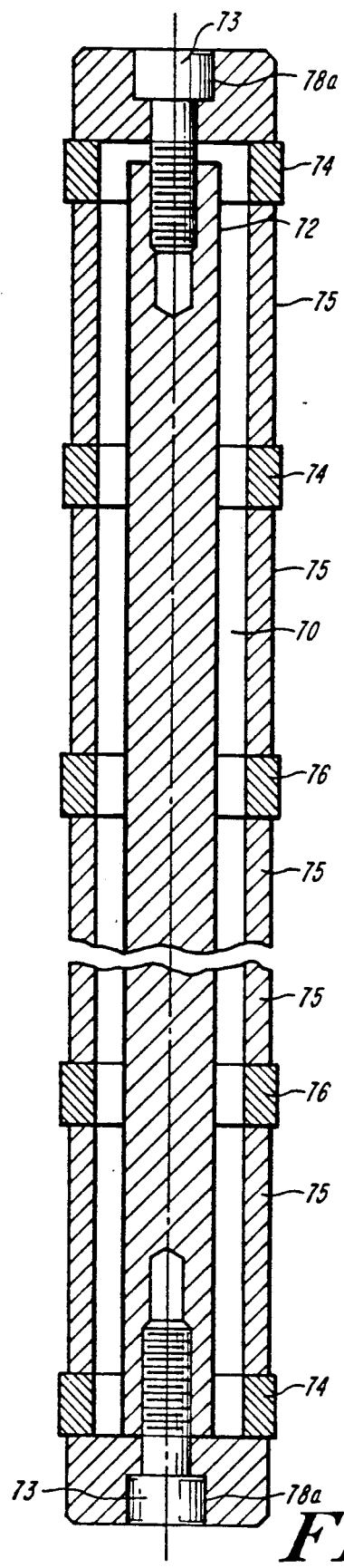
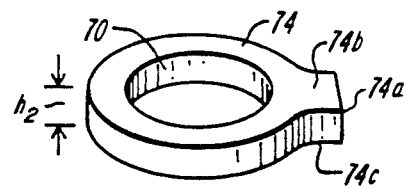
FIG. 13A
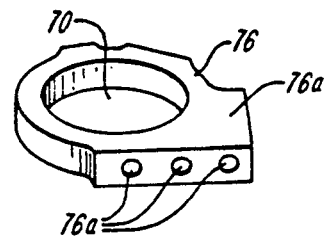
FIG. 13B
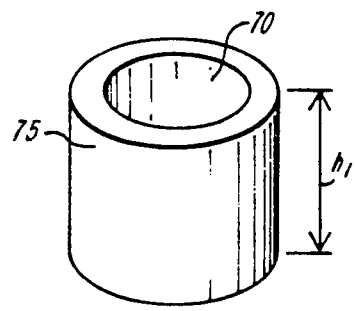
FIG. 13C
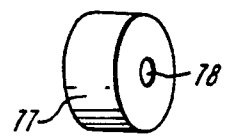
FIG. 13E
FIG. 12

STACKED BLOCK STEP GAGE

FIELD OF THE INVENTION

The invention pertains generally to step gages for calibrating measuring instruments. More particularly, the invention pertains to stacked block step gages having measuring surfaces on the neutral axis and high compressive forces between the blocks.

BACKGROUND OF THE INVENTION

Step gages are used for calibrating extremely accurate measuring instruments. A step gage typically comprises a metal block (or blocks) of a known height with opposing, parallel surfaces which are precision lapped to extremely tight tolerances. Since the height of the step gage is known to an extremely high accuracy, a measuring instrument can be calibrated based on the value measured for the height of the step gage.

Known prior art gages comprise a single block of a specified height. The opposing faces of the block are precision lapped to the desired height In single block gages, the measuring probe can contact opposing faces of the block on the neutral axis of the gage, i.e., the axis parallel to the dimension that is being measured on which the center of gravity of the gage lies. Gages which allow measuring on the neutral axis are advantageous since any bending of the gage assembly due to gravitational forces or other forces has a minimal effect on the height of the gage at its neutral axis. Single block type gages tend to be extremely precise. However, such gages are useful for measuring only a single height, whereas it is commonly desirable to test a measuring instrument at several different heights.

Step gages are known in which a series of blocks are held in non contacting relation by a age assembly. The precision lapped surfaces of the blocks comprise the measuring surfaces which the probe contacts. Non contacting block probes, such as disclosed in U.S. Pat. No. 4,445,276 issued to Voneky et al., not only provide multiple measuring surfaces at several heights along the gage, but also allow the measuring surface to be located on the neutral axis. Such gages, however, are not particularly popular because of the complexity and expense of their design and because they tend to be less accurate than other types of block gages.

Probably the most popular type of step gage is the contacting block or stacked block step gage in which a series of precision lapped blocks are stacked in contacting relationship and held together by either a through bolt extending through mating holes in the blocks or individual screws which couple each block to a preceding block via mating holes.

U.S. Pat. Nos. 3,162,955 and 3,276,312, both issued to Egli, disclose particular stacked block step gages. U.S. Pat. No. 3,162,955 (hereinafter Egli '955) discloses a block gage assembly comprising multiple blocks, each block being coupled to a preceding block by a "hermaphrodite" bolt. Each block includes a hole which is drilled through the center of the block and countersunk. A bolt slightly longer than the height of the particular block is inserted in the hole so that the threaded distal end of the bolt extends below the bottom surface of the particular block and, when the gage is assembled, extends into the block immediately below it. The holes are countersunk to a depth that will cause the head of the bolt inserted therein to be approximately flush with the top surface of the associated block. The head of each hermaphrodite bolt includes a threaded cylindrical cavity that accepts the distal end of a bolt inserted in the hole in the block placed above it. Each block is assembled to the block below it by screwing the distal end of the hermaphrodite bolt into the cavity in the head of the hermaphrodite bolt which has been inserted in the preceding block.

U.S. Pat. No. 3,276,132 (hereinafter Egli '132) discloses a step gage assembly similar to the one disclosed in Egli '995 except that the bolts inserted into the holes in the blocks do not engage the cavity in the head of the preceding bolt (i.e., they are not hermaphrodite bolts). Instead, the uppermost portion of the hole in each block is internally threaded to engagedly receive an externally threaded insert, which insert is, in turn, internally threaded to accept the threaded distal end of the bolt inserted in the next block in the assembly. Since the bolts need not contact each other, the bolts are relatively shorter than the bolts of Egli '955 and can all be of the same length. According to Egli '132, the advantage of this design is that the compressive force of each bolt is concentrated at the abutting surfaces of the two adjacent blocks, thus reducing the bending moment on the block that would normally be caused by the compressive force of a bolt which extends through the entire block. Egli '132 discloses compressive forces placed on the blocks by the bolts on the order of 100 psi. The Egli '132 patent states that higher compressive forces are undesirable for two reasons. First, high compressive forces cause bending of the gage. Second, the blocks tend to reduce in size due to the elasticity of the material under extremely high compressive forces. In other words, extremely high compressive forces, compress the blocks causing the assembled gage to be shorter than the desired height.

The Egli '955 patent discusses the possibility of lapping the individual blocks of the gage to a size slightly larger than their nominal size so that, when they are subject to the compressive forces of the bolts, the blocks reach their nominal size.

Another example of a step gage is shown in U.S. Pat. No. 2,537,340 issued to Fonda which discloses a gage block comprising three separate block sections, a steel main section and two tungsten carbide end caps which are coupled to the main section by screws which extend through holes in the end caps and engage threaded holes in either end of the main block. The lower portions of the holes in the tip pieces are slightly larger than the screws they accept to allow the tungsten tip pieces to expand at a different rate than the steel main section without warping the tip pieces through thermal stresses within the block.

It is an object of the present invention to provide an improved step gage.

It is a further object of the present invention to provide a step gage with an increased resistance to warping and damage to minimize inaccuracies in the height of the gage.

It is another further object of the present invention to provide a stacked block type step gage wherein the measuring surface is on the neutral axis of the gage.

It is yet another further object of the present invention to provide a step gage with an increased resistance to a bending moment.

It is still another further object of the present invention to provide an extremely accurate stacked block step gage.

SUMMARY OF THE INVENTION

The invention relates to a step gage of the stacked block type. In preferred embodiments, the blocks are coupled together by at least three through-rods extending through all blocks of the gage. Screws are threaded into each end of each through-rod and torqued to provide a compressive pressure on the blocks of greater than 100 psi and preferably greater than 1000 psi. Each of the through rods can be individually tightened to a different tension to correct for and reduce any bending of the gage under the high pressure. The individual blocks each include probe clearance tunnels which bisect the neutral axis of the block to provide a measuring surface on the neutral axis of the gage. In the preferred embodiment, the assembled gage is subjected to vibration treatment to more evenly distribute the stress along the threads of the screws and through-rods, thus increasing the yield point of the screw threads beyond that which would likely be encountered in normal handling of the gage.

In alternate embodiments, the through rods may be replaced by screws which individually couple one block to the preceding adjacent block and are tightened to the aforementioned minimum tensions.

In other embodiments, the gage comprises two through-rods which can be individually tightened to correct for bending in one axis. In order to eliminate any bending of the gage not parallel to that axis, the through holes of the individual block are elliptical such that they are larger than the through-rods along a second axis perpendicular to the first axis such that bending along the second axis can be corrected by adjusting the positioning of the through rods in their individual holes.

In an even further embodiment, a single centrally located through-rod is disposed in a hole larger than the through rod such that the through rod can be laterally moved in any direction to correct for bending of the gage.

BRIEF DESCRIPTION OF THE DRAWING

FIG. 12 is a cross-sectional side view of the fourth embodiment of the step gage of the present invention taken along line B—B of FIG. 11.

FIGS. 13A-13E are perspective views of the various components of the step gage of the fourth embodiment of the present invention.

DETAILED DESCRIPTION OF THE INVENTION

Figure 1:
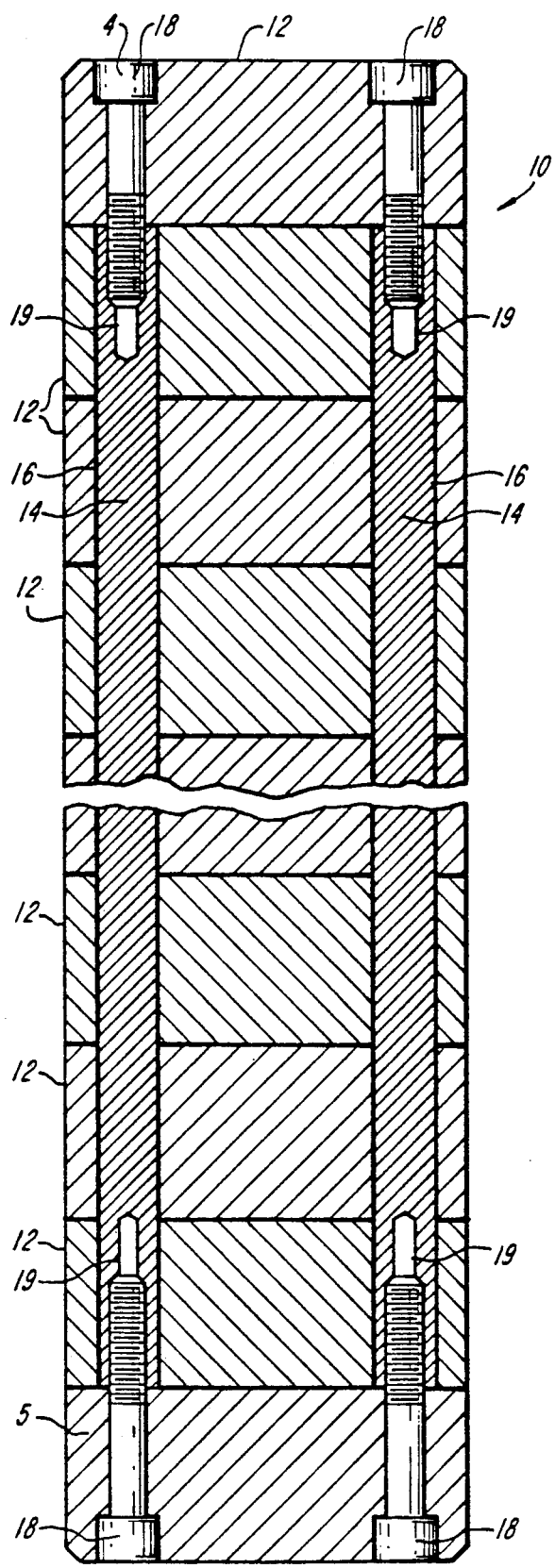
FIG. 1 is a generalized, cross-sectional side view of the step gage of the present invention.
Figure 2:
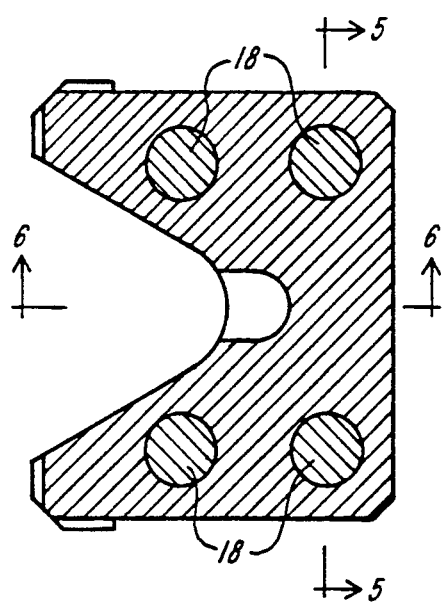
FIG. 2 is a generalized cross-sectional top view of the step gage of the present invention.

The present invention as shown in FIGS. 1 and 2, comprises a stacked block step gage 10 in which the individual blocks 12 of the gage are held together under extremely high compressive forces, such as on the order of 1,000 psi or more. In the most preferred embodiments, individual blocks 12 are coupled together by four through-rods 14 extending through mating holes 16 in blocks 12. A cylindrical, threaded cavity 19 is disposed at each end of each through-rod 14 for accepting and mating with threads of screws 18. Alternatively, the ends of each through-rod 14 may be externally threaded to mate with bolts.

Gage 10 is constructed first by inserting screws 18 into the holes 16 in the bottom most block. The rods are threaded onto screws 18 and the remaining blocks are stacked thereon so that the rods extend through holes 16 thereof. The number and size of the blocks is chosen in accordance with the desired height of the gage and the applicable testing protocol. When the final block is assembled, a screw 18 is threaded into the cylindrical cavity in the end of each rod 14 opposite the bottom most block, i.e., adjacent the top most block.

The following equations are useful for determining the parameters of the gage, such as the screw torque necessary to achieve a particular compressive pressure in the gage, and the shrinkage of the individual blocks and overall blocks, under the compressive pressure of the rods or screws.

$$Torque = C \cdot D \cdot F$$

where
  C = torque coefficient (approximately 0.2 for dry steel)
  D = outer diameter of screw threads
  F = screw (or rod) tension $$\text{Stress in rods} = \frac{\text{Force}}{\text{Cross-section area of rod}}$$

Compressive stress in each block =

$$\frac{\text{Number of rods} \cdot \text{Screw tension}}{\text{Cross-section area of block}}$$

If we assume the following parameters,
screw torque, T, = 160 inch lbs.
screw outer diameter = 0.236 inches,
gage length = 1000 mm
rod diameter = 10 mm (or 0.394 inches),
horizontal cross-sectional area of block = 3.560 sq. inches
then the following calculations provide the parameters of the exemplary gage.

$$\text{Screw tension} = F = \frac{160 \text{ in. lbs.}}{(0.236 \text{ in.})(0.2)} = 3390 \text{ lbs.}$$

In a 1,000 mm gage employing steel rods 1,000 mm in length and 0.394 inches in diameter, each rod is stretched about 0.929 mm as illustrated below:
If the rod has a diameter of 10 mm (or 0.394 inches), then $$\text{stress in each rod} = \frac{3390 \text{ lbs.}}{\frac{\pi}{4} \cdot (.394 \text{ inches})^2} = 27{,}800 \text{ psi,}$$

$$\text{Strain} = \frac{\sigma}{\text{Young's Modulus}} = \frac{27{,}800 \text{ psi}}{3.0 \times 10^7} =$$

.000926666 in/in (or mm/mm)

Stretch in 1000 mm rod = (.000926666)(1000 mm) = .929 mm

If the cross sectional area of the block is 3.560 in², the compressive pressure between the blocks is approximately 3,775 pounds per square inch (psi) as calculated below:

$$\text{Compressive stress in each block} = \frac{4 \times 3660 \text{ lbs.}}{3.560 \text{ in.}^2} = 3809 \text{ lbs./in.}^2 \text{ or psi}$$

$$\text{Strain} = \frac{\sigma}{\text{Young's Modulus}} = \frac{3809}{3.0 \times 10^7} =$$

.000126966 in/in (or mm/mm)

Under this strain, each block s height decreases 0.00317 mm., as calculated below.

Block compression = (25 mm)(0.000126966 mm/mm) = 0.00317 mm

Since the compression of the blocks is quite accurately known, the blocks can be lapped to a predetermined size greater than the nominal size such that, under the high compressive forces, they are compressed to the nominal size.

Standardized protocols for evaluating the accuracy of measuring instruments exist. The gages of the present invention are particularly designed to meet the requirements of two specific protocols, the American National Standard Institute's Methods for Performance Evaluation of Coordinate Measuring Machines, ANSI/ASME B89.1.12M-1985 (hereinafter the ANSI/ASME protocol) and the German National Standard, Accuracy of Coordinate Measuring Machines, VDI/VDE 2617 (hereinafter the VDI/VDE protocol).

The ANSI/ASME protocol requires that measurements be made between measuring surfaces facing in the same direction. For coordinate measuring machines having full measurement lines of 250 mm or less, distances between the steps may be no greater than 25 mm. For lengths greater than 250 mm, the lengths between steps may be no greater than 1/10 of the full scale measurement line of the machine.

The VDI/VDE protocol requires that measurements be made between measurement surfaces facing in opposite directions and for any measurement line, measurements of ten different lengths be made. The shortest length must be no greater than 25 mm.

Figure 3:
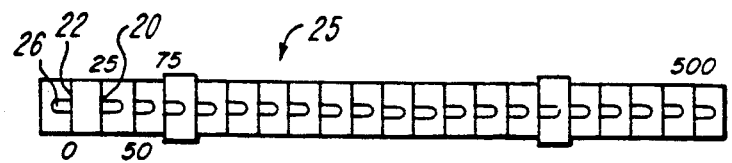
FIG. 3 is a side view of a first embodiment of the step age of the present invention.
Figure 5:
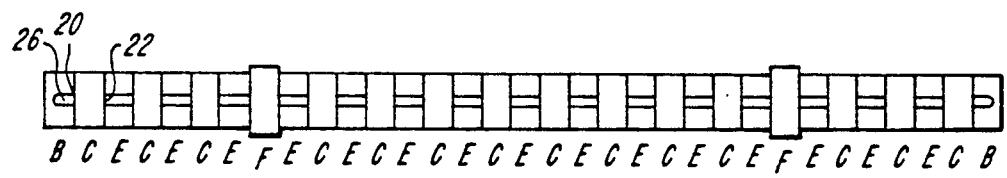
FIG. 5 is a side view of a second embodiment of the step gage of the present invention.

In accordance with these protocols, the embodiment shown in FIG. 3 are preferred for gages of length up to 500 mm, whereas the embodiment shown in FIG. 5 is preferred for gages 500 mm in length and greater. The purposes of the different embodiments will become apparent from the discussion below.

FIG. 3 shows a step gage constructed in accordance with a first embodiment of the present invention which is preferred for gages 500 mm or less in height. The ANSI/ASME protocol specifies that gages of length less than 500 mm should be tested with measuring intervals of 25 mm with the probes contacting measuring surfaces facing in the same direction. In accordance with this protocol, the gage 25 of FIG. 3 is constructed of four different types of blocks designated blocks A, B, C and D. As shown in FIG. 3, the gage is formed mostly of A blocks except that the blocks at either end of the gage are B blocks. A C block is placed adjacent one of the end B blocks. Finally, D blocks are occasionally substituted for A blocks in the block sequence. The structure and purpose of each block is explained below.

Figure 4A:
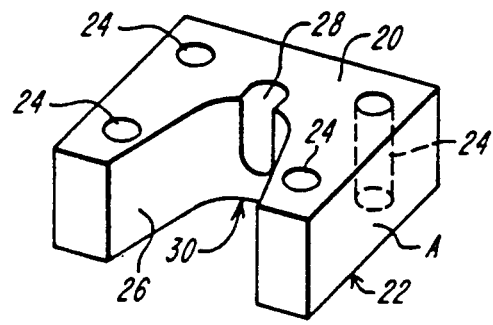
FIGS. 4A-4F are perspective views illustrating the individual blocks from which the first and second embodiments of the step gage of the present invention are constructed.
Figure 4B:
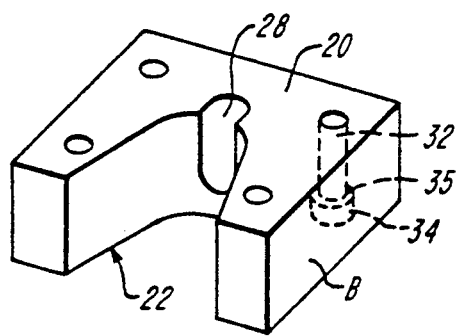
Figure 4C:
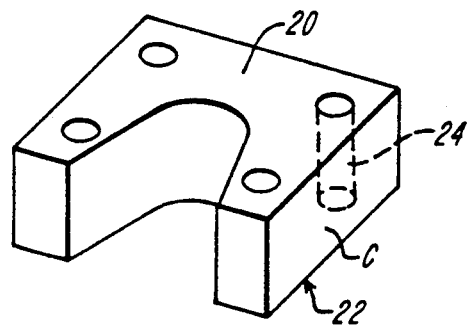
Figure 4D:
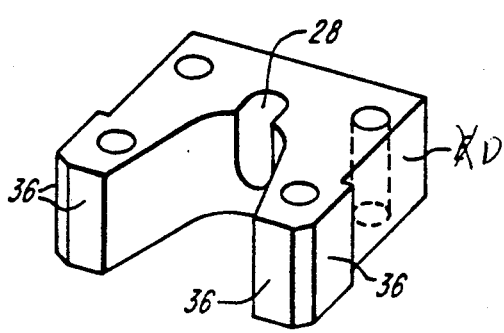

The construction of the various blocks is shown in FIGS. 4A–4F. An A block is shown in FIG. 4A. The A block comprises two opposing, parallel, precision lapped surfaces 20 and 22. In the preferred embodiment, surfaces 20 and 22 of each block are spaced 25 mm apart. Each A block comprises four drilled through holes 24 disposed near the corners of the block. The block has a semi-elliptical cut-out 26. Within the semi-elliptical cut out is a second cut out, probe clearance channel 28, communicating with the upper surface 20 and extending halfway to the bottom surface 22. Probe clearance channel 28 allows the probe access to the area on the surface 22 of the adjacent block disposed on the neutral axis of the block. This area is the measuring surface 30. An end block, B, is shown in FIG. 4B and is identical to an A block except that the holes 24 are replaced by holes 32 which are through-drilled and counterbored at one end as shown at 34. These holes are counterbored to accept the heads of the screws which engage the through rods and fasten the gage together under pressure. A C Block is shown in FIG. 4C and is identical to an A block except that probe clearance channel 28 and measuring surface 30 are eliminated for reasons explained below. Finally, a D block is shown in FIG. 4D and is identical to an A block except that it has additional projecting surfaces 36. The projecting surfaces 36 are precision lapped to be perpendicular to the faces 20 and 22 and measuring surface 30, and are used to align the assembled gage with the measuring line of the coordinate measuring machine to be tested. The holes 24 in the A, C and D blocks allow rods 14 to pass therethrough. The holes 32 in the end cap B blocks are designed to accept the screws 18. The counterbored portions 34 of holes 32 in the B blocks accept the heads of screws 18 which rest on shoulders 35. To reduce the complexity of block construction, the B block at each end is identical. Accordingly, one of the B blocks must be assembled to the gage upside down relative to the other B block and other blocks in a gage. The C block, which is essentially an A block without a probe clearance channel is assembled adjacent to the "upside down" B block. Since the probe clearance channel 28 of the "upside down" B block affords access to the measuring surface of the adjacent C block, there is no need for a probe clearance channel 28 in the C block to access the neutral axis. The neutral axis of the top surface 20 of the C block is accessible and can be used as the measuring surface. The purpose of the C block is to provide for the possibility of taking measurements on opposing surfaces, as required by the VDI/VDE protocol.

The D blocks are substituted for B blocks at intervals throughout the gage and, as described above, are useful in aligning the gage as it is being constructed.

Measuring probes can access and contact the centrally located measuring surfaces of the A blocks via cut-out 26 and and probe clearance channel 28. The measuring surface of the A blocks is on or near the neutral axis and also is protected from damage by contact with other objects since it is well protected by the surrounding block.

Figure 4E:
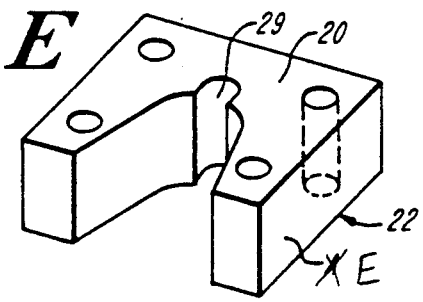
Figure 4F:
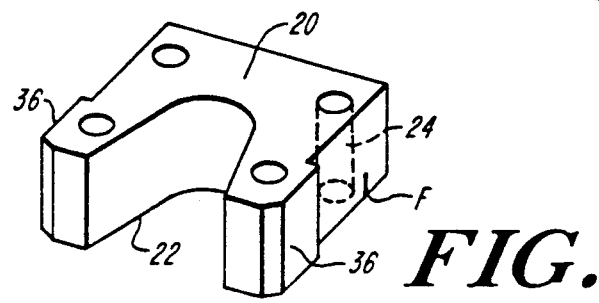

For gages in excess of 500 mm in height, the alternative embodiment shown in FIG. 5 is preferred. The embodiment of FIG. 5 uses B and C blocks, but not A or D blocks. The embodiment of FIG. 5 uses two new blocks, E and F blocks, as shown in FIGS. 4E and 4F, respectively. An E block, as shown in FIG. 4E is similar to an A block except that probe clearance channel 28 is replaced by probe clearance channel 29 which is cut completely through the block. An F block, as shown in FIG. 4F, is similar to a D block except the probe clearance channel is eliminated. The gage is formed as shown in FIG. 5 and essentially comprises alternating C and E blocks with the end caps formed from B blocks. F blocks are substituted for C blocks at various points in the gage to assist in the alignment of the gage with the measuring line of the machine being tested. In this embodiment, the measuring surfaces comprise the top and bottom surfaces of the C blocks (or F blocks as the case may be). Since the probe clearance channel extends completely through the E blocks from the top surface to the bottom surface, the neutral axis portion of the top surface 20 and bottom surface 22 of the C blocks (or F blocks) are accessible, thus allowing the probe to contact those surfaces so that they can be used as the measuring surfaces. Accordingly, in this embodiment, the measuring surfaces remain on the neutral axis of the gage. Further, measurements can be taken with the probes contacting opposing measuring surfaces or contacting measuring surfaces facing the same direction.

The embodiments of FIG. 3 and FIG. 5 are adapted for use with both the ANSI/ASME and VDI/VDE protocols. For instance, the gage of FIG. 3 is useful for measurement lines up to 500 mm. With respect to the ANSI/ASME protocol, all steps, except step 22 which faces in the wrong direction, may be used. Since the distance between all steps is 25 mm, the ANSI/ASME requirement that no step exceeds 25 mm is met. The gage of FIG. 5 is adapted for lines 500 mm in length or longer. All measurements are made between alternate measuring surfaces, since these all face in the same direction. Since the blocks are 25 mm long, alternate faces are 50 mm apart, or 1/10 of 500 mm. Accordingly, the ANSI/ASME requirement is met by the gage of FIG. 5.

Turning to the VDI/VDE protocol, the FIG. 3 gage is also used for measurement lines up to 500 mm. All measurements are made from step 22 to some other step. This meets the VDI/VDE protocol since the measurements are taken from opposing faces with a minimum step of 25 mm. For measurement lines over 500 mm, the FIG. 5 gage is used. The shortest measurement, made from one face of any C block to the opposing face of the same C block is 25 mm. Thereafter, opposite facing measuring surfaces are available every 50 mm. Again, this is consistent with the VDI/VDE protocol.

The extremely high compressive forces of the present invention provide distinct advantages over the prior art. As discussed above, if the screws 18 are tightened to a torque of approximately 160 inch lbs., the tension in each rod will be approximately 3,390 lbs. In a gage 1,000 mm in height, each rod is stretched approximately 0.929 mm. In this example, the compressive pressure between the blocks would be approximately 3,809 psi.

An obvious advantage of a high compressive force is that it will more effectively prevent slippage between the blocks and bending of the gage during handling.

Figure 6:
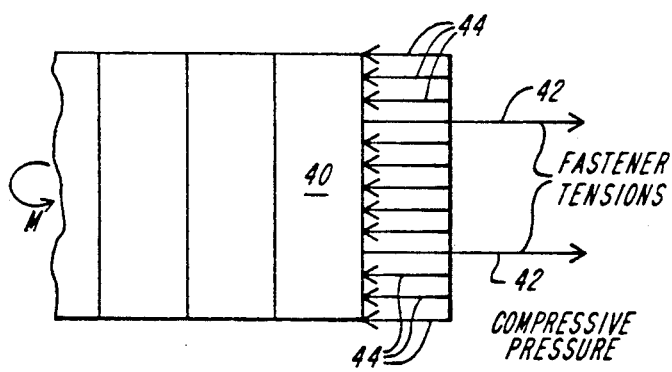
FIG. 6 is a diagram illustrating the forces applied to the surface of a block of a step gage assembled in a stack under normal conditions.
Figure 7:
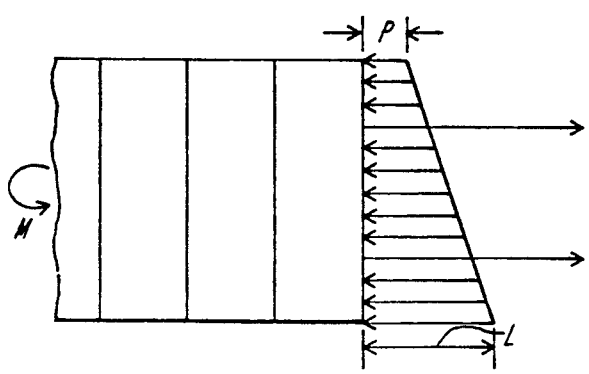
FIG. 7 is a diagram illustrating the forces applied to the surface of a block of a step gage assembled in a stack subject to a bending moment.
Figure 8:
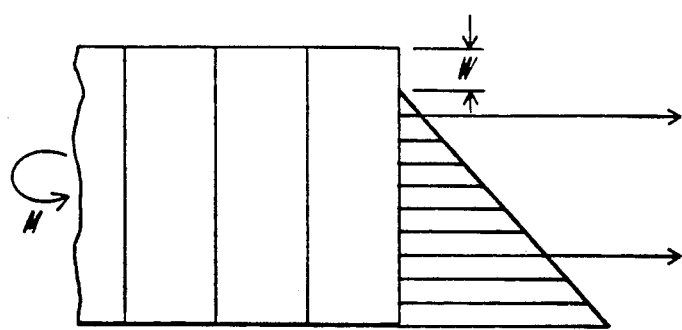
FIG. 8 is a diagram illustrating the forces applied to the surface of a block of a step gage assembled in a stack subject to a bending moment greater than the bending strength of the gage.

FIGS. 6, 7 and 8 illustrate the advantages of the invention's use of high compressive forces between the blocks.

When two blocks are secured together by very high tensions, distortion of the blocks occurs. In areas furthest from the fastenings, i.e., furthest from the through-rods, the blocks tend to bend slightly away from each other to relieve the pressure between the blocks. The blocks will distort to a shape in which the blocks have the minimum strain energy.

In a block gage greater than two blocks in height, the situation is quite different. FIG. 6 illustrates stress and force distribution across one of the faces of a block 40 in the middle of a gage. It should be understood that there is a block to the right of block 40 which is not shown. As shown in FIG. 6, except for the end blocks, each block in the gage is subject to compressive forces at both faces and, therefore, cannot bend away from either of its neighboring blocks since that would involve simultaneously bending in opposite directions. Accordingly, the blocks remain flat, and compressive pressure is uniform over the block face. There is some decrease in pressure at the extreme edges of the face due to radial distortion, however, this effect is negligible. As shown in FIG. 6, the through-rods and screws exert forces 42 on each other which are concentrated at the holes. To counterbalance the tensile force of the through rods, the blocks exert pressure on each other in opposite direction to the fastener force 42, as illustrated by pressure arrows 44.

When a bending moment M, as shown in FIG. 7, is applied to the gage, the average compressive pressure on the block face remains constant. However, the distribution of the compressive pressure changes to balance the moment, as shown in FIG. 7. Pressure is greatest at one extreme end of the block, shown as pressure L, and linearly decreases to a minimum pressure P at the other end. As the moment M is increased, minimum pressure P at one edge of the face decreases, while maximum pressure L at the opposite edge increases. As shown in FIG. 8, if moment M is high enough, the compressive pressure P at the extreme edge can be reduced to zero and a gap will appear between the blocks as shown at W in FIG. 8. The moment M which causes pressure P to equal 0 is termed the bending strength of the gage. When a gap forms in a gage due to bending moment greater than the bending strength of the gage, dirt and oil can enter into the gap causing the gage to be inaccurate even after the bending moment is released. Obviously, as the force 42 of the fasteners is increased, the counterbalancing pressure 44 on the block faces also increases. Accordingly, the greater the tension on the fasteners, the greater the bending strength of the gage.

The Egli patents, however, teach that it is undesirable to increase the tension on the blocks much beyond 100 psi despite the desire to increase the bending strength of the gage because the extremely high compressive pressures of the rods will itself cause the gage to bend.

The present invention, in all its various embodiments, overcomes this problem and allows for compressive pressures between the blocks that are orders of magnitude greater than 100 psi. By utilizing multiple rods rather than a single through-rod, each rod can be individually tensioned to a different compressive pressure to eliminate any bending of the gage.

When the gage is assembled, it is checked for bending within specified tolerance limits. To check for bending, the gage height can be measured at each of its four corners. If one or more of the corners is out of specification, the tension in one or more of the through rods can be individually adjusted by tightening or loosening the corresponding screws to cause a commensurate decrease or increase, respectively, in the height of the gage at that corner or corners.

Further, the use of through rods rather than screws to individually couple each block to the preceding block is advantageous because the greater length of the through-rods provides more elasticity than screws. Accordingly, changes in tension of the rods due to handling is significantly reduced.

Mating screw threads cannot be accurately produced at a reasonable expense. Therefore, when a screw such as screw 18 is entered into a threaded hole such as in the through rods, contact between the mating screw threads appears at a few points. As the screw is tightened, yielding of the screw thread surfaces occurs and the number and extent of the areas of contact increases. When a screw is fully tightened, part of the screw thread surface is in contact and stressed to the yield point, part is in contact at lower stresses and part is not in contact at all. The increased amount of yielding of the screw threads in the present invention caused by the greater compressive force makes the screws more vulnerable to reduction of the screw tensions during handling and an increase in the height of the gage during handling. This is undesirable. This problem is overcome in the present invention by subjecting the assembled gage to subresonant vibration treatment after the screws have been fully torqued (i.e., after assembly and individual tensioning of the screws to correct for any bending) but before the calibration. As described in A. G. Hebel Jr., *Subresonant Vibrations Relieve Residual Stress,* Metal Progress, November 1985, pp 51–55, subresonant vibration about $\frac{1}{3}$ the peak resonance frequency of the item) increases atomic activity, thus relieving stress. It is important to select a subresonant vibration frequency where the item (gage) damps most of the vibratory energy thereby using the vibratory energy to increase atomic activity as opposed to resonant energy. The vibration treatment causes the screw thread surfaces to yield even further (and the height of the gage to increase further) beyond that which would be caused by normal handling. The gage can then be height calibrated. The screw thread yielding caused by the vibration treatment is greater than any yielding likely to be caused by normal handling and, therefore, the gage is unlikely to increase in height due to normal handling.

In its most effective form as previously described, the gage comprises three or more rods whose ends are not positioned in a straight line on the surface of the end block. If the rods are disposed in a line, individual tensioning of the rods cannot correct for components of a bending moment not parallel to that line.

Figure 10:
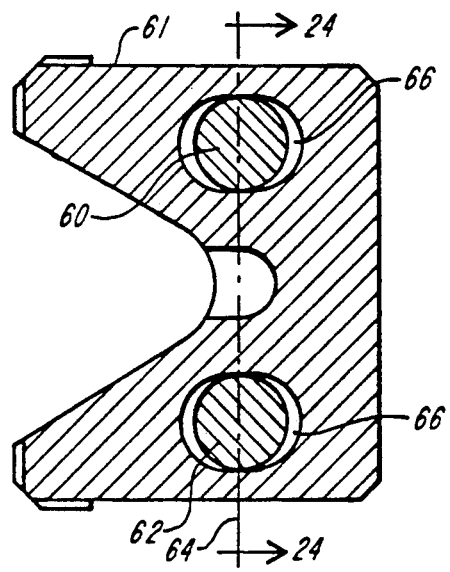
FIG. 10 is a cross-sectional top view of a third embodiment of the step gage of the present invention.
Figure 9:
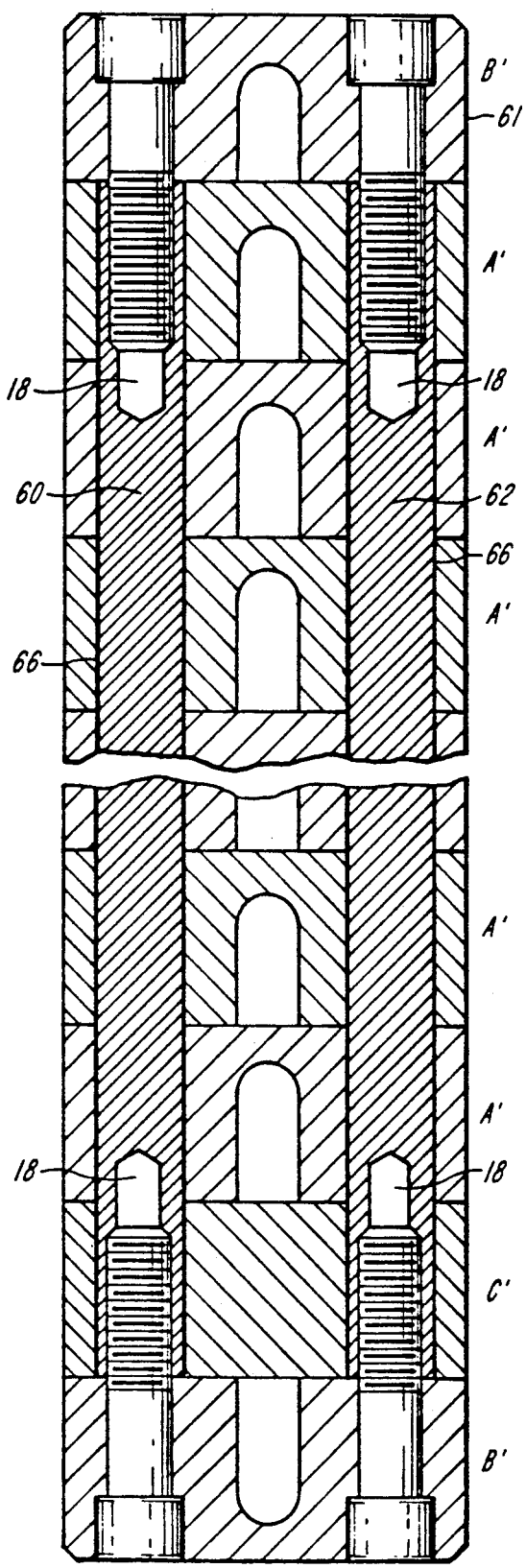
FIG. 9 is a cross-sectional side view of a third embodiment of the step gage of the present invention.
Figure 11:
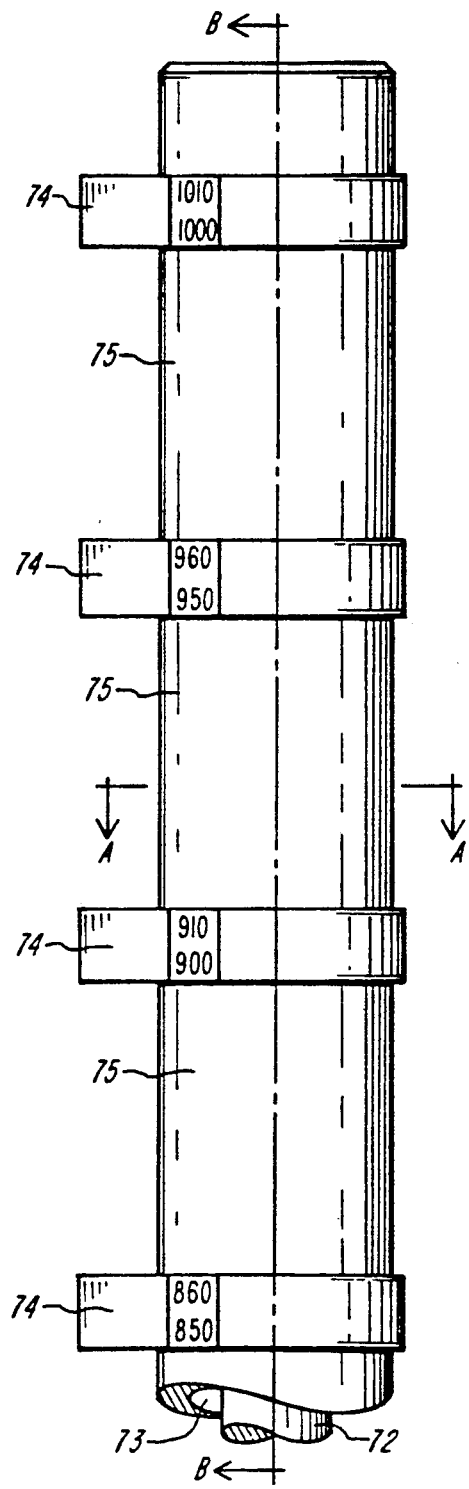
FIG. 11 is a side view of a fourth embodiment of the step age of the present invention.
Figure 13D:
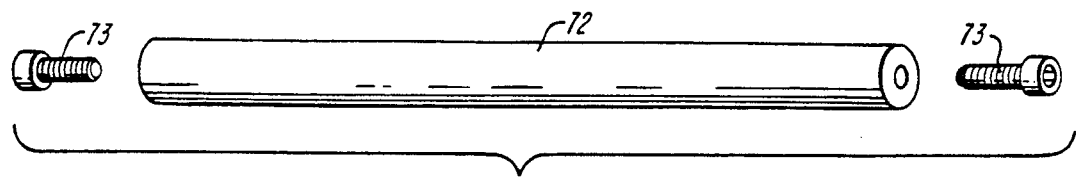

However, alternate embodiments of the invention are envisioned which utilize less than three rods yet, nonetheless, allow correction of all bending moments. For instance, FIGS. 9 and 10 show a gage utilizing only two through-rods 60 and 62 disposed on line 64. Line 64 intersects through-rods 60 and 62 on the face of B block 61. The holes 66 in the blocks through which the through-rods 60 and 62 pass, are elliptical and have a major axis perpendicular to line 64. This configuration allows the screws to be individually positioned within the holes (i.e., adjusted left to right in FIG. 10) to correct for any bending moment component perpendicular to the line 64. The two rods also can be adjusted to different tensions to correct for any component of a bending moment parallel to line 64. In FIG. 9, the individual blocks are labeled as A', B', or C' blocks. These blocks are substantially similar to the correspondingly lettered blocks shown in FIG. 4 except that they comprise only two holes 24 (or 32 in the case of the B and B' blocks) rather than four.

FIGS. 11–15 illustrate a further embodiment of the present invention utilizing only a single through-rod and a mounting bracket. In this embodiment, the hole 70 is positioned on the neutral axis and is circular in shape but is slightly larger than the through-rod 72.

FIGS. 13A–13E illustrates the individual components of the step gage of this embodiment. The step gage of this embodiment primarily comprises alternately stacked step blocks 74 and block spacers 75 both having central holes 70 for accepting a through-rod 72. The step block 74 comprises a protection 74a having opposing measuring surfaces 74b and 74c. In the preferred embodiment the height $h_1$ of the block spacer 75 is 40 mm and the height $h_2$ of the step blocks 74 is 10 mm. At two points along the length of the gage, the step blocks 74 are replaced by mounting step blocks 76. Mounting step block 76 is similar to step blocks 74 except they are provided with projection 76a comprising three threaded screw holes 76b for mounting to a mounting bracket as described below. The through-rod holes 70 in the step blocks 74, block spacers 75 and mounting step blocks 76 have a larger diameter than the through-rod 72. An end cap 77 is provided at each end of the gage having a central hole 78 for accepting the distal end of screws 73. The holes 78 are counterbored as shown at 78a in FIG. 12 for accepting the heads of screws 73. The end caps 77 are placed over the step blocks 74 at either end of the gage and the screws 73 are inserted in the holes 78 and screwed into threaded cavities in either end of through-rod 72. The gage is then checked for bending. If the gage is bent beyond the acceptable tolerance, the screws 73 are loosened and the screws and rods are moved transversely within hole 70 in a direction which will correct for the bending. The screws 73 are then retightened. After one or more trials, bending should be reduced to within tolerance. Since the through-rod 72 is on the neutral axis in this embodiment, the measuring surfaces cannot also be located on the neutral axis. However, a mounting bracket 79 is provided which assures that the measuring surfaces will remain on the neutral surface of the gage. Although the single through-rod embodiment prevents placement of the measuring surface on the neutral axis, it affords a significant savings in weight. The blocks of a gage must comprise a sufficient mass and surface area to support its through-rods. Accordingly, with only one through-rod, the cross-section of the gage perpendicular to the rod can be greatly reduced. Accordingly, in many circumstances, the single rod embodiment may be preferred.

Figure 14:
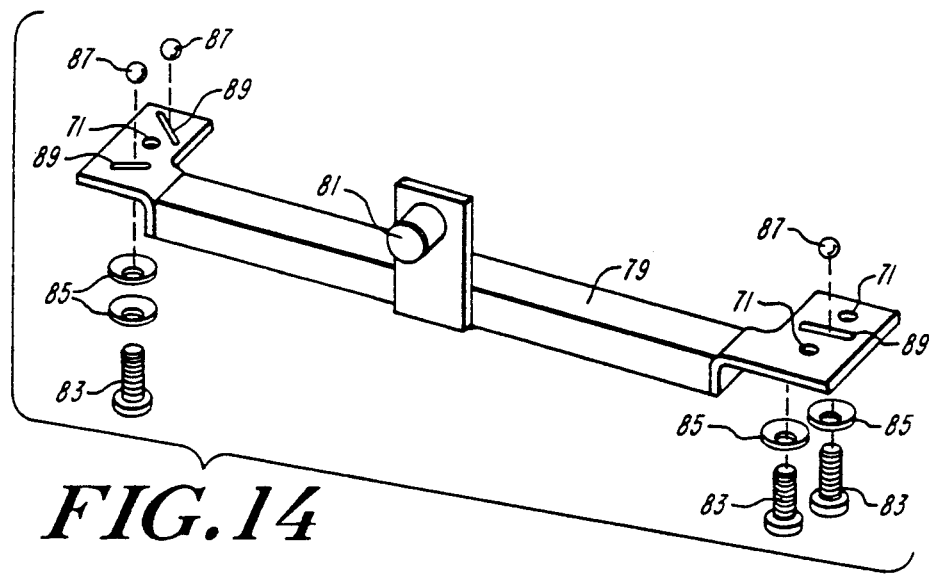
FIG. 14 is a perspective view of a mounting bracket of the step gage of the fourth embodiment of the present invention.

Mounting bracket 79, shown in FIG. 14, is designed to assure that the gage is mounted with the measuring surfaces on the neutral surface. The bracket 79 is mounted in a stand (not shown) by means of a stud 81 which fits into a horizontal hole in the stand. Accordingly, the mounting step blocks 76 are positioned in the step gage such that the holes 76b mate with the screws 83 in the bracket 79. The length of the bracket 79 and positioning of the mounting step blocks are chosen with respect to the length of the step gage such that the bending moments of the gage due to its own weight cancel each other to the maximum extent possible.

The distal ends of screws 83 fit through holes 71 in mounting bracket 79 and within threaded holes 76b on mounting step blocks 76. Conical springs 85 are provided on the screws to help prevent overtightening of the screws and damaging of the gage. Balls 87 are placed in slots 89 on the mounting bracket 79 such that the step gage does not contact the mounting bracket except at balls 87. The purpose of the balls is to minimize the contact area between the gage and the mounting bracket to three small points so as to avoid the warping of the gage which might otherwise occur if the gage was compressed against a flat surface of the mounting bracket 79. The mounting step blocks 76 are oriented with respect to the measuring surfaces of the step blocks 74 such that when the gage is mounted in the bracket 79 and the bracket is mounted with stud 81 in a horizontal hole, the measuring surfaces of step blocks 74 are on the neutral surface of the bending moment of the gage caused by the weight of the gage hereafter termed the gravitational bending moment (see FIG. 15). In this manner, even though the measuring surfaces are not on the neutral axis, they will be on the neutral surface if the gage is properly mounted.

Figure 16:
FIG. 16 is a side view of a fifth embodiment of the step age of the present invention.
Figure 17:
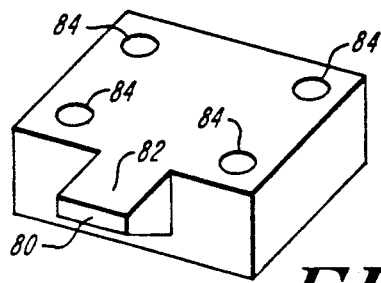
FIG. 17 is a perspective view of one block of the step gage of the fifth embodiment of the present invention.

FIGS. 16 and 17 illustrate a further embodiment of the invention utilizing four through-rods but providing measuring surfaces off the neutral axis. This embodiment utilizes two different blocks, H blocks and I blocks. As shown in FIG. 17, each H block is provided with an outcropping 80 which provides measuring surface 82 at the edge of the block. The H blocks include four through holes 84 for accepting through-rods as previously described. The I blocks are used as end blocks and are similar to the H blocks except they are not provided with projections 80 and the holes are through drilled and counterbored for accepting the heads of the screws. This embodiment has the advantage of providing a more accessible measuring surface. However, the disadvantage is that the measuring surface is not on the neutral axis.

Figure 15:
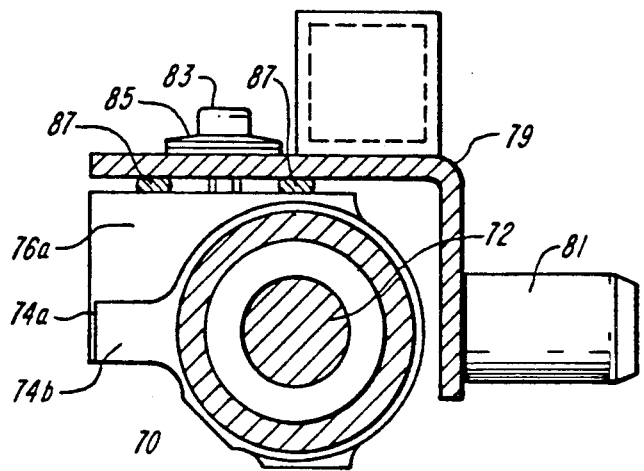
FIG. 15 is a cross sectional top view of the step gage of the fourth embodiment of the present invention mounted on the mounting bracket of FIG. 14, taken along line A—A of FIG. 11.
Figure 18:
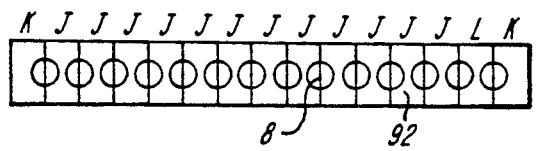
FIG. 18 is a side view of a sixth embodiment of the step age of the present invention.
Figure 19:
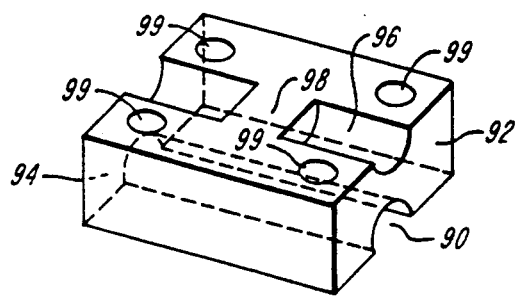
FIG. 19 is a perspective view of one block of the step gage of the sixth embodiment of the present invention.

FIGS. 18 and 19 illustrate another embodiment of the present invention embodying J blocks, K blocks and L blocks. FIG. 19 shows a J block. Each J block comprises a semi circular tunnel 90 extending completely through the block from side surface 92 to side surface 94. A similar tunnel 96 is provided on the opposite face of the block but does not extend completely through the block from surface 92 to surface 94. Instead, the central portion of the tunnel is left within the block so as to provide measuring surface 98. The J blocks are provided with four through-drilled holes 99 for accepting rods. The K blocks are similar to the J blocks except that tunnel 96 is not present and the holes are through-drilled and counterbored to accept the heads of the screws. The L block is similar to the J block except tunnel 90 is replaced by a tunnel like tunnel 96. In other words both of the tunnels in the L block are tunnels 96. When the gage is assembled as shown in FIG. 15, the measuring surfaces 98 are accessible from either side of the gage.

Figure 20:
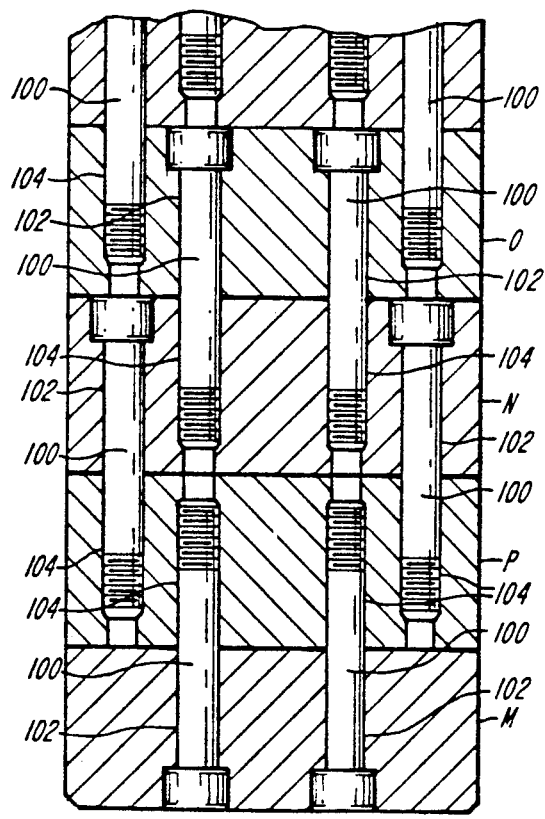
FIG. 20 is a cross-sectional side view of a seventh embodiment of the step gage of the present invention.
Figure 21:
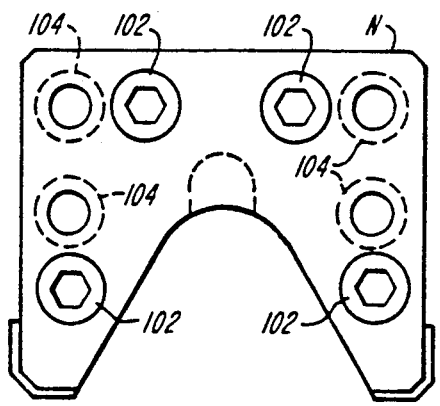
FIG. 21 is a cross-sectional top view of an eighth embodiment of the step gage of the present invention.
Figure 22:
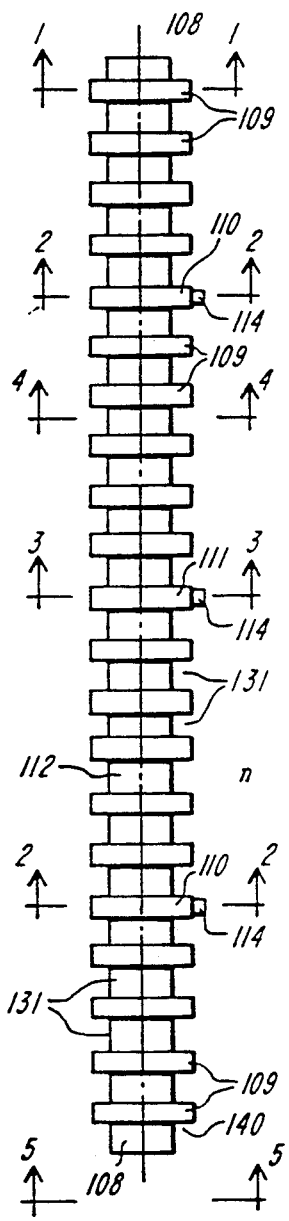
Figure 23:
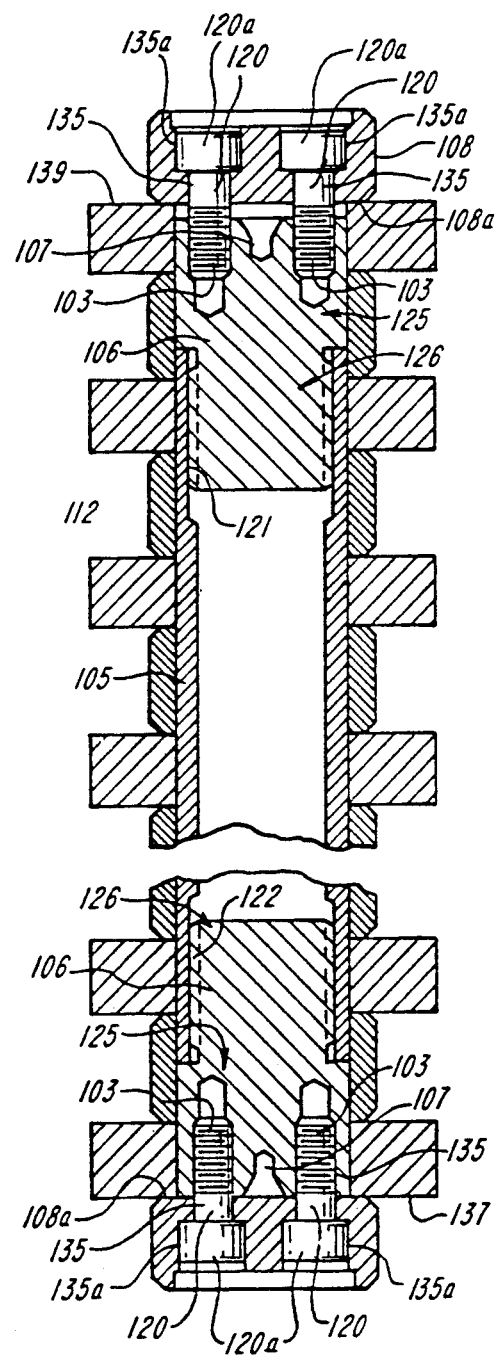
Figure 24A:
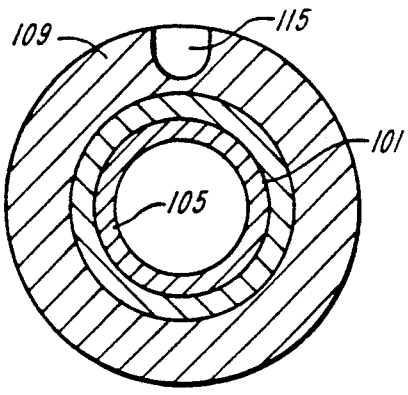
Figure 24B:
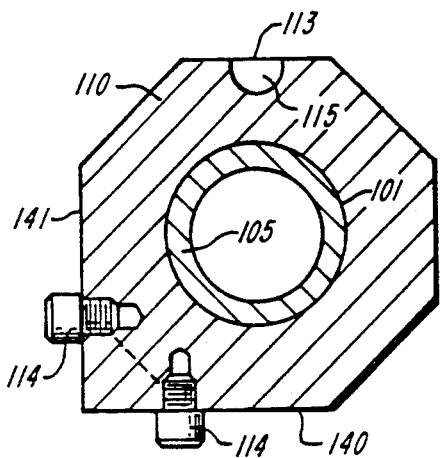
Figure 24C:
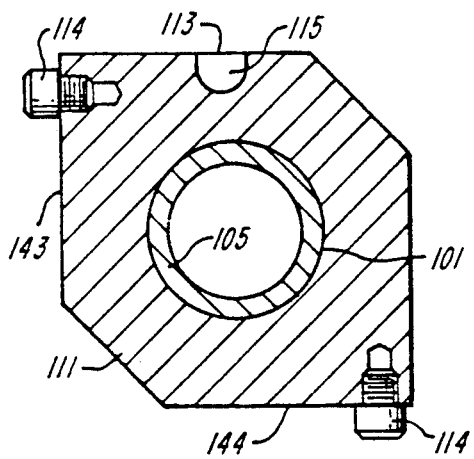
Figure 24D:
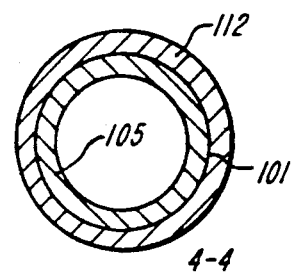
Figure 25:
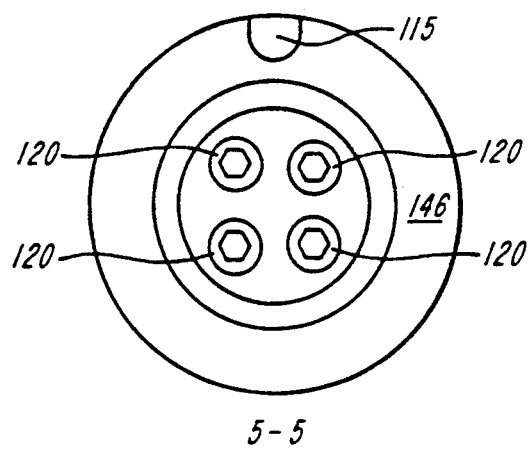
Figure 26:
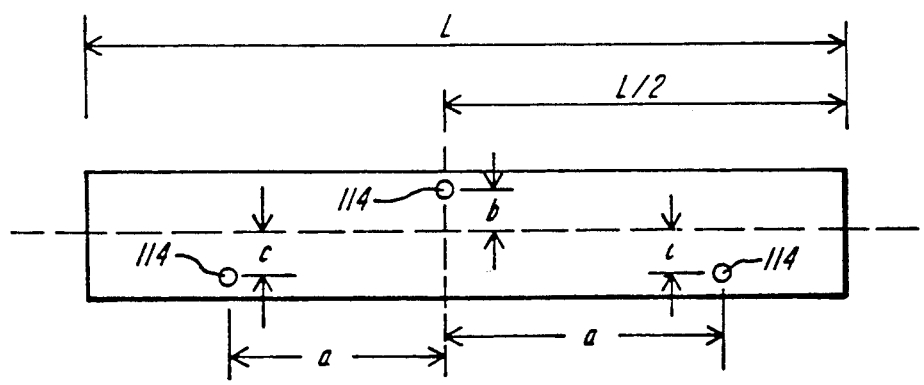

FIGS. 20 and 21 show yet one more embodiment of the present invention. In this embodiment, the through rods are replaced by individual screws 100 which couple one block to the preceding block. FIGS. 20 and 21 show a gage in which each block is coupled to the preceding block by four screws 100. However, it should be understood that this type of gage can also be constructed using fewer screws in the fashion previously described with respect to embodiments utilizing fewer than four through-rods. In this four screw embodiment, each end cap block, M, may be essentially the same as the B block shown in FIG. 4B, except the four holes may be positioned in different locations on the block as shown in FIG. 20 for reasons that will become apparent. The intermediate blocks comprise alternately stacked N blocks and O blocks. The N blocks and O blocks are essentially similar to one another except they comprise two distinct hole patterns. An exemplary N block is shown in FIG. 21. In the four screw embodiment, each N and O block comprises eight holes. Four of the holes 102 are through drilled and counterbored to accept screw heads. The other four holes 104 are oversized partially through the block and tap drilled and tapped the remaining length of the block and internally threaded for engagedly accepting the threads of the distal ends of screws 100. The N blocks and O blocks differ in that the relative positions of holes 102 and 104 are exchanged. The alternate interleaving of the N blocks and O blocks allows the blocks to be individually coupled by the screws in the gage construction. A P block is provided adjacent one of the M blocks as shown in FIG. 20. The P block comprises eight threaded holes 104 with four of the holes facing in one direction and the other four holes facing in the opposite direction. The P block allows one of the M blocks to be mounted "upside down" with respect to the other blocks.

The advantage of individually coupling each block to the preceding block with screws is that, during construction, the stack height can be checked periodically and corrected for accumulated errors. For instance, if bending is approaching an unacceptable limit, the screws of the next few blocks can be tightened differentially to keep the growing assembly within its bending tolerance. A disadvantage however, is that the stability of this type of gage is not as good as for gages using through rods.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A step gage comprising:
   a plurality of blocks stacked in contacting relation, said blocks being compressed together under a compressive force greater than 100 pounds per square inch by compressing means, said compressing means comprising means for compensating for bending of the step gage while said blocks are being compressed together under a compressive force exceeding 100 pounds per square inch.

2. A step gage as set forth in claim 1 wherein the compressing means comprise at least one through-rod extending through the blocks and wherein the blocks further comprise mating holes for accepting the through-rod.

3. A step gage as set forth in claim 2 wherein the at least one through-rod is shorter than the step gage and comprises a threaded cavity at each end and wherein the compressing means further comprises screws adapted to engage (1) the threaded cavities of the through-rod and (2) a surface of the first and last blocks of said gage, so as to apply the compressive force between the blocks.

4. A step gage as set forth in claim 3 wherein said at least one through-rod comprises at least three parallel through-rods positioned relative to one another such that they cannot be intersected by a single line, said compensating means comprising said screws, whereby any bending of the gage can be corrected by applying a particular compressive source in each through-rod.

5. A step gage as set forth in claim 2 wherein said at least one through-rod comprises two parallel through-rods and wherein said holes in said blocks are larger than said through-rods at least in the direction perpendicular to a line which intersects both through-rods and is perpendicular to the length of said through-rods, said compensating means comprising the holes in said blocks and means for tensioning said through-rods, whereby said through-rods can be individually tensioned to correct for any component of bending of the gage parallel to said line and said through-rods can be individually positioned in their corresponding holes to correct for any component of bending of the gage in a direction perpendicular to said line.

6. A step gage as set forth in claim 3 further comprising and end cap block at each end of the gage, said end cap block comprising holes which are counterbored for accepting the heads of the screws which rest on a shoulder formed where the counterbored portion of the hole meets the non-counterbored portion of the hole.

7. A step gage as set forth in claim 2 wherein the compressive force between the blocks of the gage is approximately 3,809 psi.

8. A step gage as set forth in claim 1 wherein the compressing means comprise a plurality of screws for coupling each block to an adjacent block, each screw comprising a head and a threaded distal portion.

9. A step gage as set forth in claim 8 wherein each block comprises,
   a plurality of through-drilled and counterbored holes for freely accepting said screws such that the heads of the screws rest upon shoulders formed at the ends of the counterbored portions of said holes and the distal portions of the screws extend beyond the block when inserted in said holes, and
   a plurality of threaded holes for matingly engaging the threaded distal portion of the screws inserted in said through-drilled and counterbored holes of an adjacent block.

10. A step gage as set forth in claim 9 constructed of at least first and second types of blocks in alternating order, wherein the through-drilled and counterbored holes in said first type of block are positioned to mate with the threaded holes in said second type of block and the through-drilled and counterbored holes in said second type of block are positioned to mate with the threaded holes in said first type of block.

11. A step gage as set forth in claim 1 wherein the gage had been subjected to vibration treatment after assembly.

12. A step gage as set forth in claim 1 wherein said compressive force is greater than 3000 psi.

13. A step gage comprising;
    a plurality of blocks stacked in contacting relation, each of said blocks comprising four through-drilled holes, the plurality of blocks including a first block and a last block, each having an outer surface thereof,
    four through-rods, each of said through-rods extending from the outer surface of the first block to the outer surface of the last block and comprising a threaded cavity adjacent each of the outer surfaces of the first and last blocks, and
    a threaded screw associated with each threaded cavity of each through rod, each screw being adapted to engage its associated threaded cavity and the outer surface of the first and last blocks of said gage for applying a compressive force between all of the blocks.

14. A step gage as set forth in claim 13 wherein said through-drilled holes of said first and last blocks are counterbored to accept the heads of said screws to rest on a shoulder formed in said holes where said counterbored portion of said holes meets the through-drilled portion of said holes.

15. A step gage as set forth in claim 14 wherein some of said blocks in said step gage comprise side surfaces that extend outwardly from said gage, said surfaces being precision lapped perpendicular to said measuring surfaces of said gage, whereby alignment of the gage during assembly is facilitated.

16. A step gage comprising;
    a plurality of blocks stacked in contacting relation, wherein at least some of said blocks comprise a measuring surface on the neutral axis of said block and at least some of said blocks comprise a probe clearance channel which allows access to one of said measuring surfaces, each block further comprising a pair of holes,
    two parallel through-rods disposed in said holes in said blocks, wherein said through rods are smaller than said holes in at least the dimension perpendicular to the length of the through-rods, and means for inducing a compressive force in said rods which causes a compressive force on said blocks of greater than 1000 psi, whereby the compressive force in each of the through-rods can be individually selected to correct for any component of bending of the gage generally parallel to said line and the through-rods can be individually positioned in the corresponding holes to correct for any component of bending of the gage in a direction generally perpendicular to said line.

17. A step gage as set forth in claim 16 wherein said holes are elliptical having a major axis in the dimension perpendicular to said line and said through-rods.

18. A step gage comprising;
a plurality of blocks stacked in contacting relation, each block comprising a hole disposed about the neutral axis of the block,
a through-rod of radial dimension smaller than said holes in said blocks, said through-rod extending through said holes in said blocks, whereby any bending of the gage an be corrected by adjusting the position of the through-rod in the holes, and
means for inducing a compressive force in the through-rods which causes a compressive force on the blocks of greater than about 1000 psi.

19. A step gage as set forth in claim 18 wherein said compressive force is greater than approximately 3000 psi.

20. A step gage as set forth in claim 19 wherein at least some of said blocks further comprise a projection comprising a measuring surface extending outwardly from the block, all of said measuring surfaces intersecting a single plane parallel the length of said step gage.

21. A step gage as set forth in claim 20 further comprising means for mounting said step gage to a stand such that said measuring surfaces are on the neutral surface of the gravitational bending moment of the gage.

22. A step gage comprising:
a plurality of blocks stacked in contacting relationship along generally parallel, contacting surfaces, said blocks being compressed together along said contacting surfaces under a compressive force on the order of at least 1,000 pounds per square inch by compressing means, said means for compressing comprising means for compensating for bending of the step gage under compressive forces.

23. A step gage as set forth in claim 22 wherein said means for compressing comprises at least one rod extending through the blocks and wherein the blocks further comprise mating holes for accepting said rod.

24. A step gage comprising:
a plurality of blocks stacked in contacting relation, including a first block and a last block;
three generally parallel through-rods extending through the blocks and positioned relative to one another such that they cannot be intersected by a single line, each through-rod having a threaded cavity disposed in each end thereof; and
screws adapted to engage 1) the threaded cavities disposed in the ends of said through-rods and 2) a surface of said first and last blocks of said gage, so as to apply a compressive force between said blocks such that bending of the gage can be corrected by applying a particular compressive force in each through-rod.

25. A step gage comprising:
a plurality of blocks stacked in contacting relation,
a pair of generally parallel through-rods, and
the blocks further comprising mating holes for accepting the through-rods, wherein the holes are larger than said through-rods at least in a direction perpendicular to a line which intersects both through-rods and is perpendicular to the length of the through-rods such that the through-rods can be individually tensioned to correct for any component of bending of the gage parallel to said line and the through-rods can be individually positioned in the corresponding holes to correct for any component of bending of the gage in a direction perpendicular to said line.

26. A step gage comprising:
a plurality of blocks stacked in contacting relation,
a plurality of screws for coupling each block to an adjacent block, each screw having a head and a threaded distal portion,
said blocks further comprising a plurality of through-drilled and counter-bored holes for freely accepting said screws such that the heads of the screws rest upon shoulders formed at the ends of the counter-bored portions of said holes and the distal portions of the screws extend beyond the block when inserted in said holes, and
said blocks further comprising a plurality of threaded holes for matingly engaging the threaded distal portion of the screws inserted in said through-drilled and counter-bored holes of an adjacent block.

* * * * *

UNITED STATES PATENT AND TRADEMARK OFFICE
CERTIFICATE OF CORRECTION

PATENT NO.   : 5,231,768
DATED        : August 3, 1993
INVENTOR(S)  : Walter L. Beckwith, Jr.

It is certified that error appears in the above-indentified patent and that said Letters Patent is hereby corrected as shown below:

On drawing sheets, delete Figs. 22-26, contained on sheets 9 of 11, 10 of 11 and 11 of 11.

Signed and Sealed this

Eighth Day of March, 1994

Attest:

BRUCE LEHMAN

*Attesting Officer*      *Commissioner of Patents and Trademarks*